United States Patent [19]
Sehring et al.

[11] 3,903,204
[45] Sept. 2, 1975

[54] S-(N-METHYL-N-PHENYL-CARBAMOYLMETHYL) ESTERS OF CERTAIN THIOPHOSPHONIC AND DITHIOPHOSPHONIC ACIDS

[75] Inventors: Richard Sehring; Wolfgang Buck; Gerbert Linden, all of Ingelheim am Rhein, Germany

[73] Assignee: Celamerck GmbH & Co. KG, Ingelheim am Rhein, Germany

[22] Filed: Apr. 11, 1974

[21] Appl. No.: 460,154

[30] Foreign Application Priority Data
Apr. 21, 1973  Germany............................ 2320371

[52] U.S. Cl. .................... 260/943; 71/87; 260/972
[51] Int. Cl. ............................................... C07f 9/40
[58] Field of Search.......................... 260/943; 71/87

[56] References Cited
UNITED STATES PATENTS
3,102,019  8/1963  Speziale et al................... 260/943 X
3,351,679  11/1967  Szabo et al. ........................ 260/943
3,717,690  2/1973  Newman................................ 71/87

OTHER PUBLICATIONS
Fine Chemical Patents Journal, Vol. 6, No. 48, 12-2-1966, British, 5: Gen. Org., p. 7.

*Primary Examiner*—Lorraine A. Weinberger
*Assistant Examiner*—Richard L. Raymond
*Attorney, Agent, or Firm*—Hammond & Littell

[57] ABSTRACT
Compounds of the formula

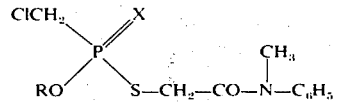

wherein
R is alkyl of 1 to 4 carbon atoms, and
X is oxygen or sulfur;
the compounds are useful as herbicides.

10 Claims, No Drawings

S-(N-METHYL-N-PHENYL-CARBAMOYLMETHYL) ESTERS OF CERTAIN THIOPHOSPHONIC AND DITHIOPHOSPHONIC ACIDS

This invention relates to novel S-(N-methyl-N-phenyl-carbamoylmethyl) O-alkyl-chloromethyl-thiophosphonates -alkyl-chloromethyl-thiophosphonates and -dithiophosphonates, as well as to a method of preparing these compounds.

More particularly, the present invention relates to a novel class of thiophosphonic and dithiophosphonic acid esters represented by the formula

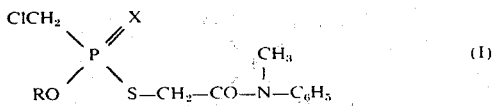 (I)

wherein
R is alkyl of 1 to 4 carbon atoms, and
X is oxygen or sulfur.

The compounds of the formula I may be prepared by reacting an O-lower alkyl chloromethyl-phosphonate or thiophosphonate chloride of the formula

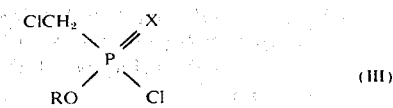 (III)

wherein R and X have the same meanings as in formula I, with a thioglycolic acid N-methyl-anilide of the formula

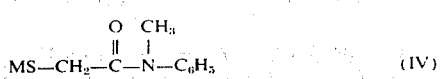 (IV)

wherein M is hydrogen or a cation or one equivalent of a cation, such as the ammonium ion or an alkali metal cation.

When M in formula IV is hydrogen, the reaction must be performed in the presence of an acid acceptor, for instance an organic base, such as triethylamine, pyridine, dimethylaniline or the like, or an inorganic base. The reaction is performed in an inert organic solvent, such as benzene, toluene, dioxane, methylene chloride, methyl ethyl ketone or the like.

When X in formula III is sulfur, the reaction may also be carried out in water or an aqueous solvent.

The starting compounds may be prepared by known methods. For instance, a compound of the formula III is obtained by reacting a chloromethyl-phosphonic acid or -thiophosphonic acid dichloride with a lower alkanol of the formula

ROH         (V)

wherein R has the meanings previously defined, in the presence of a base (see Houben-Weyl 12/1, 417 et seq. and 560 et seq.).

A compound of the formula IV may be prepared from chloroacetic acid, N-methyl-aniline and ammonium thiocyanate pursuant to the method described in J. Prakt. Chem. 153, 68 (1939).

The end products of the present invention are obtained in pure form and with good yields; they are yellowish oils which cannot be distilled without decomposition. The raw products may be purified by extraction of a solution thereof in a suitable solvent with dilute sodium hydroxide or a dilute acid and water, followed by evaporation of the solution in vacuo. The proof of purity is effected by means of thin-layer chromatography (on silicagel plates; flow agent: Heptan/acetone = 2:1). The purified compounds are characterized by elemental analysis and refraction indeces; their NMR- and IR-spectra confirm the indicated structural formula.

The following examples illustrate the present invention and will enable others skilled in the art to understand it more completely. It should be understood, however, that the invention is not limited solely to the particular examples given below.

EXAMPLE 1

S-(N-Methyl-N-phenyl-carbamoylmethyl O-ethyl-chloromethyldithiophosphonate 193.5 gm (1 mol) of O-ethyl chloromethyl-thiophosphonate chloride and 183.0 gm (1 mol) of thioglycolic acid N-methyl-anilide were dissolved in 1 liter of benzene, and 101 gm (1 mol) of triethylamine were added dropwise to the solution at room temperature over a period of one hour. The resulting mixture was then stirred for two hours at 40°C. Thereafter, the reaction solution was stirred twice with 300 ml of water each, then extracted with 200 ml of 1N sodium hydroxide, dried with sodium sulfate and evaporated in vacuo, yielding 330 gm (98% of theory) of a yellowish oil having a refractive index $n_D^{20}$ = 1.5889, which was identified to be the compound of the formula

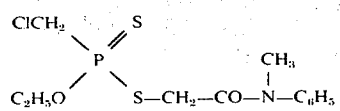

Analysis: Calculated: C-42.5%; H-5.02%; N-4.13%; Cl-10.5%; P-9.16%. Found: C-42.85%; H-5.14%; N-4.03%; Cl-10.38%; P-9.26%.

EXAMPLE 2

S-(N-Methyl-N-phenyl-carbamoylmethyl) O-n-butyl-chloromethyl-thiophosphonate 7.7 gm (0.0375 mol) of O-n-butyl-chloromethylphosphonate chloride and 6.8 gm (0.0375 mol) of thioglycolic acid N-methyl-anilide were dissolved in 200 ml of benzene, and a solution of 3.8 gm of triethylamine (0.0375 mol) in 15 ml of benzene was added dropwise thereto at about 25°C. The resulting mixture was stirred for four hours at room temperature, the precipitated triethylamine hydrochloride was separated by vacuum filtration, and the filtrate was evaporated in vacuo, leaving 13.3 gm (100% of theory) of a light yellow oil having a refractive index $n_d^{20}$ = 1.5493, which was identified to be the compound of the formula

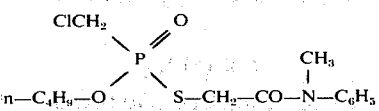

Analysis: Calculated: C-48.2%; H-6.01%; N-4.01%; Cl-10.16%. Found: C-48.18%; H-5.97%; N-4.15%; Cl-9.37%.

EXAMPLE 3

Using a procedure analogous to that described in Example 1, S-(N-methyl-N-phenyl-carbamoylmethyl) O-methyl chloromethyl-dithiophosphonate, $n_D^{20} = 1.6043$, of the formula

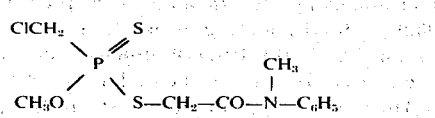

was prepared from O-methyl chloromethyl-thiophosphonate chloride and thioglycolic acid N-methyl-anilide.

EXAMPLE 4

Using a procedure analogous to that described in Example 2, S-(N-methyl-N-phenyl-carbamoylmethyl) O-n-butyl-chloromethyl-dithiophosphonate, $n_D^{20} = 1.5704$, of the formula

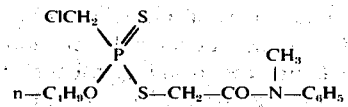

was prepared from O-n-butyl-chloromethyl-thiophosphonate chloride and thioglycolic acid N-methyl-anilide.

EXAMPLE 5

Using a procedure analogous to that described in Example 2, S-(N-methyl-N-phenyl-carbamoylmethyl) O-isopropyl-chloromethyl-dithiophosphonate, $n_D^{20} = 1.5783$, of the formula

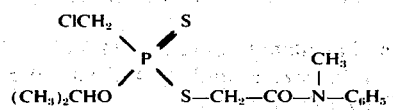

was prepared from O-isopropyl-chloromethyl-thiophosphonate chloride and thioglycolic acid N-methyl-anilide.

EXAMPLE 6

Using a procedure analogous to that described in Example 1, S-(N-methyl-N-phenyl-carbamoylmethyl) O-n-propyl-chloromethyl-dithiophosphonate, $n_D^{20} = 1.5760$, of the formula

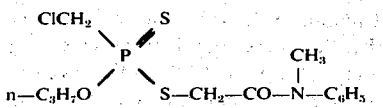

was prepared from O-n-propyl-chloromethyl-thiophosphonate chloride and thioglycolic acid N-methyl-anilide.

EXAMPLE 7

Using a procedure analogous to that described in Example 1, S-(N-methyl-N-phenyl-carbamoylmethyl) O-ethyl-chloromethyl-thiophosphonate, $n_D^{20} = 1.5420$, of the formula

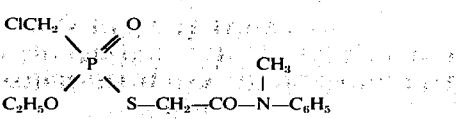

was prepared from O-ethyl chloromethyl-phosphonate chloride and thioglycolic acid N-methyl-anilide.

EXAMPLE 8

Using a procedure analogous to that described in Example 2, S-(N-methyl-N-phenyl-carbamoylmethyl) O-sec.butyl-chloromethyl-thiophosphonate, $n_D^{20} = 1.5470$, of the formula

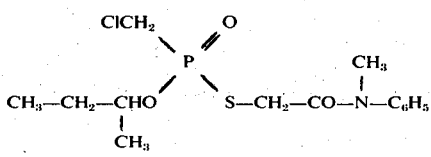

was prepared from O-sec.butyl chloromethyl-phosphonate chloride and thioglycolic acid N-methyl-anilide.

EXAMPLE 9

Using a procedure analogous to that described in Example 2, S-(N-methyl-N-phenyl-carbamoylmethyl) O-isobutyl-chloromethyl-thiophosphonate, $n_D^{20} = 1.5471$, of the formula

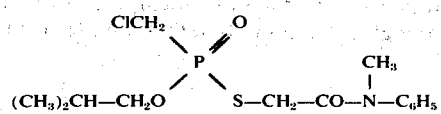

was prepared from O-isobutyl chloromethyl-phosphonate chloride and thioglycolic acid N-methyl-anilide.

The compounds of the present invention, that is, those embraced by formula I above, have useful properties. More particularly, the compounds of this invention are effective agricultural herbicides, especially against such weeds as amaranth, portulaca, eleusine, digitaria, alopecurus, chinocloa, veronica, echinocloa, galium and various grassy weeds, such as millet, while being free from phytotoxicity toward such useful plants as rice, wheat, beets and the like.

For instance, when the end product of Example 1 was applied at the rate of 1.5 kg per hectare to a rice field three days after seeding, the rice plants were unaffected, whereas various grassy weeds and chinocloa were 100% eradicated and 97.5% eradication of amaranth was achieved.

When the end product of Example 6 was applied to a rice field at the rate of 1.5 kg/hectare ten days after emergence of the rice plants, a 97.5 to 100% herbicidal effect was obtained against amaranth, portulaca, eleusine, digitaria and various grassy weeds, while the rice plants remained unaffected.

The application of the end product of Example 3 at the rate of 0.5 kg/hectare to a barley field before emergence produced a 95% eradication of alopecurus; the compatibility rate was greater than 4 kg/hectare.

For effective control of amaranth and veronica, a rate of application of 0.8 kg/hectare of the end product of Example 4 was required.

The end product of Example 5, when applied to a beet field before emergence, was very effective for controlling alopecurus, echinocloa and galium, but was compatible with the beet plants.

Finally, the end product of Example 8 proved to be effective for the control of grassy weeds at a rate of application of 4 kg/hectare, while being completely compatible with the useful plants.

For agricultural herbicidal purposes the compounds of the present invention are incorporated as active ingredients into conventional agricultural herbicidal compositions, such as emulsions, solutions, suspensions, dusting powders, granulates or the like. The active ingredient concentration in these compositions may vary between about 0.05 and 95% by weight, preferably up to about 70% by weight.

Most advantageously, the compounds of the present invention are formulated into concentrate compositions, such as emulsion concentrates or wettable powders, which can be diluted with water to the desired application concentration, that is, to an active ingredient concentration of 0.05 to 3% by weight, before use.

The following examples illustrate a few agricultural herbicidal compositions comprising a compound of the present invention as an active ingredient and represent the best modes contemplated of putting the invention into practical use. The parts are parts by weight unless otherwise specified.

EXAMPLE 10

Emulsion Concentrate

The concentrate is compounded from the following ingredients:

| | | |
|---|---|---|
| S-(N-Methyl-N-phenyl-carbomoyl-methyl) O-ethyl-chloromethyl-dithiophosphonate | 44 | parts |
| Solvent (mixture of liquid aromatic hydrocarbons) | 36 | " |
| Emulsifier (mixture of alkylaryl sulfonate and polyoxyethylene-triglyceride) | 20 | " |

Preparation

The ingredients are intimately admixed with each other by stirring. Prior to use, the concentrate is diluted with water to the desired application concentration of the active ingredient between 0.05 and 3% by weight, and the resulting aqueous emulsion is a spray composition with very effective herbicidal action.

EXAMPLE 11

Wettable Powder

The powder is compounded from the following ingredients:

| | | |
|---|---|---|
| S-(N-Methyl-N-phenyl-carbamoyl-methyl) O-methyl-chloromethyl-dithiophosphonate | 50 | parts |
| Emulsifier (sodium lignin sulfonate) | 9 | " |
| Wetting agent (sodium naphthalene sulfonate) | 1 | " |
| Silicic acid | 40 | " |

Preparation

The ingredients are admixed with each other, and the mixture is milled into a fine powdere. Prior to use, the powder is suspended in a sufficient amount of water to make the active ingredient concentration in the aqueous suspension between 0.05 and 3% by weight. The suspension is a spray composition with effective herbicidal action.

Analogous results are obtained when any one of the other compounds embraced by formula I is substituted for the particular active ingredient in Examples 10 and 11. Likewise, the amount of active ingredient in these illustrative examples may be varied to achieve the concentration range set forth above, and the amounts and nature of the inert carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

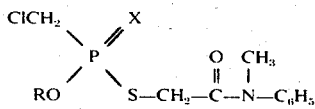

wherein
R is alkyl of 1 to 4 carbon atoms, and
X is oxygen or sulfur.

2. The compound of claim 1 which is S-(N-methyl-N-phenyl-carbamoylmethyl) O-ethyl-chloromethyl-dithiophosphonate.

3. The compound of claim 1 which is S-(N-methyl-N-phenyl-carbamoylmethyl) O-n-butyl-chloromethyl-thiophosphonate.

4. The compound of claim 1 which is S-(N-methyl-N-phenyl-carbamoylmethyl) O-methyl-chloromethyl-dithiophosphonate.

5. The compound of claim 1 which is S-(N-methyl-N-phenyl-carbamoylmethyl) O-n-butyl-chloromethyl-dithiophosphonate.

6. The compound of claim 1 which is S-(N-methyl-N-phenyl-carbamoylmethyl) O-isopropyl-chloromethyl-dithiophosphonate.

7. The compound of claim 1 which is S-(N-methyl-N-phenyl-carbamoylmethyl) O-n-propyl-chloromethyl-dithiophosphonate.

8. The compound of claim 1 which is S-(N-methyl-N-phenyl-carbamoylmethyl) O-ethyl-chloromethyl-thiophosponate.

9. The compound of claim 1 which is S-(N-methyl-N-phenyl-carbamoylmethyl) O-sec.butyl-chloromethyl-thiophosphonate.

10. The compound of claim 1 which is S-(N-methyl-N-phenyl-carbamoylmethyl) O-isobutyl-chloromethyl-thiophosphonate.

* * * * *